United States Patent Office 3,383,953
Patented May 21, 1968

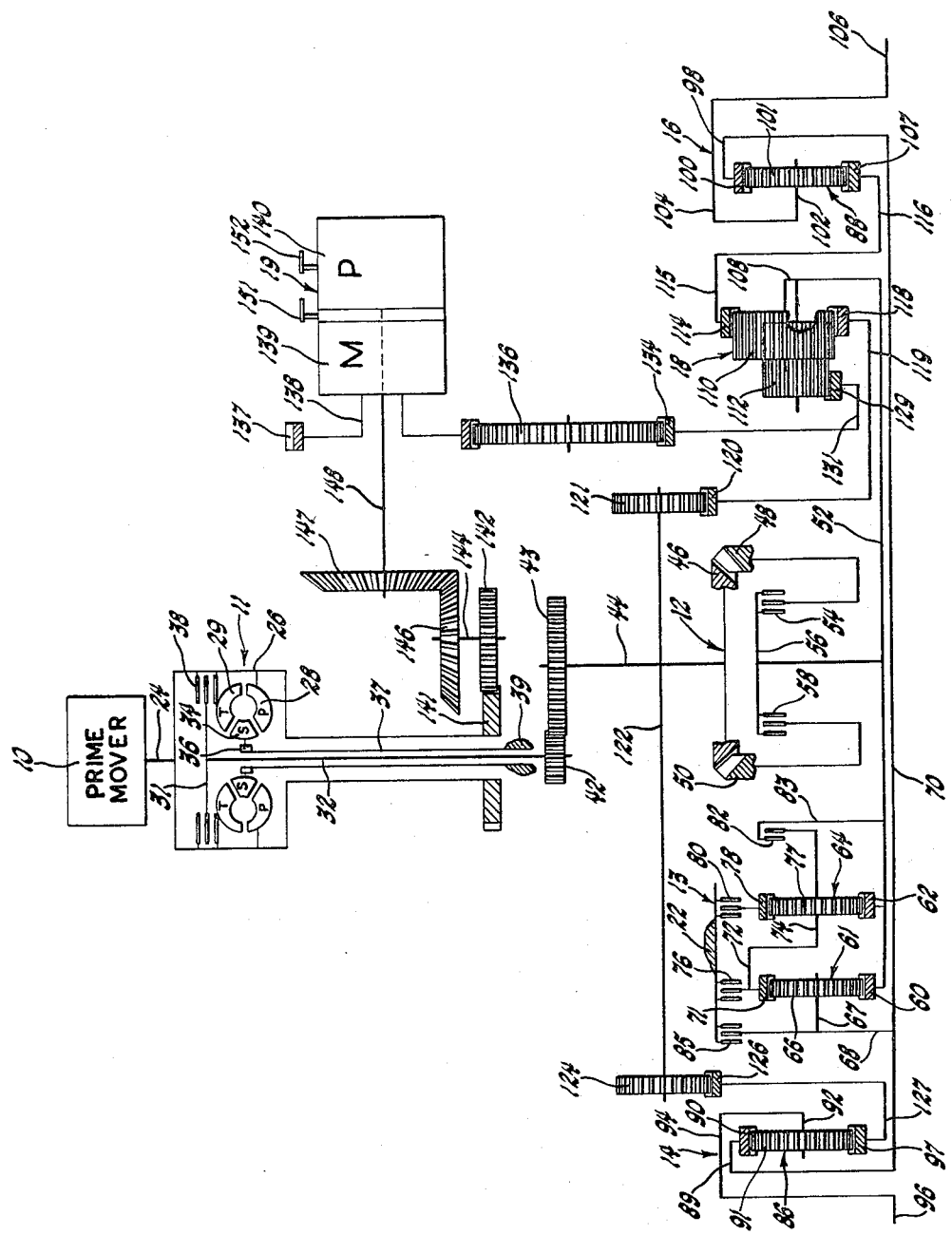

3,383,953
POWER TRAIN
Howard W. Christenson, Indianapolis, Ind., assignor to General Motors Corporation, Detroit, Mich., a corporation of Delaware
Filed Sept. 29, 1965, Ser. No. 491,128
12 Claims. (Cl. 74—720.5)

ABSTRACT OF THE DISCLOSURE

A single input, dual output, vehicle power train having an input driven hydrostatic unit controlling a differential gear unit arranged intermediate of and coaxial with a pair of output differential gear units and cooperating with a multiple speed ratio gear unit to provide single and dual input drive to the output differential gear units for straight vehicle drive and to provide single and dual input differential drive to the output gear differential units for steering. The hydrostatically controlled differential gear unit has an input carrier having a pinion meshing with an output sun gear, an output ring and another pinion which meshes with a controlled sun gear which is either held or driven.

---

This invention relates to power trains and more particularly to a single input, dual output power train providing multiple speed range and hydrostatic steering operation.

In track-laying vehicles, it is advantageous to have a power train capable of providing multiple speed range operation for matching the prime mover to the vehicle and also steering for different turn radii to enable a high degree of maneuverability. Where steering is accomplished by engagement of a friction device and it is desired to negotiate a turn of greater radius than the fixed minimum turn radius, the friction device must be slipped. During the slippage period, the steering system is torque sensitive and the vehicle controllability thus becomes dependent on the variable track forces required for steering. Since the required track forces are largely dependent on vehicle speed, design and load, this torque sensitive type of steering restricts vehicle design and usage.

The principle of this invention lies in a hydrostatically controlled, combined planetary pinion differential gear unit compactly arranged in a single input, dual output power train for selectively providing a pair of equal speed, unidirectional drives for straight, forward and reverse drive ranges and a pair of infinitely variable, differential speed, unidirectional and opposite directional drives for steering.

The invention is illustrated in one embodiment in a power train having a torque converter and a multiple speed ratio gear unit connecting a prime mover to a pair of differential steer gear units which steer units are for driving the vehicle's propelling devices. The hydrostatically controlled differential gear unit is arranged intermediate of and coaxial with the steer units and has carrier input from a selective forward and reverse input drive to the multiple speed ratio gear unit and ring gear output to one steer unit and sun gear output to the other steer unit. A first set of pinions carried on the carrier meshes with the output sun gear and output ring gear and also meshes with a second set of carried pinions. A controlled sun gear meshes with the second set of pinions and is connected to the motor of a hydrostatic unit whose pump is driven by the prime mover. The hydrostatic unit is controllable to either hold the connected differential sun gear to provide equal speed, unidirectional drives to the steer units for straight, forward and reverse drive in all drive ranges or to drive the connected differential sun gear in either direction dependent on the direction of turn desired to provide infinitely variable and differential speed drives to the steer units for steering in all drive ranges and infinitely variable and equal speed, opposite directional drives for steering in neutral.

An object of this invention is to provide a new and improved single input, dual output power train offering multiple speed range and hydrostatic steering operation.

Another object of this invention is to provide in a single input, dual output power train, a controlled, combined planetary pinion, differential gear unit for providing a pair of equal speed, unidirectional drives to the outputs, a pair of infinitely variable and differential speed, unidirectional drives to the outputs and a pair of infinitely variable and equal speed, opposite directional drives to the outputs.

Another object of this invention is to provide in a power train, a hydrostatically controlled differential gear unit arranged intermediate of and coaxial with a pair of output differential gear units for cooperating with a multiple speed ratio gear unit to provide single and dual input drive to the output differential gear units for straight drive and to provide single and dual input differential drive to the output differential gear units for steering.

Another object of this invention is to provide in a single input, dual output power train, a multispeed gear unit for effecting a power path from the input to the pair of outputs to provide a plurality of different drive ranges and a hydrostatically controlled, combined plenetary pinion, differential drive for providing opposite directional drives to the outputs in neutral for steering and for providing differential speed drives to the outputs in the different drive ranges for steering.

Another object of this invention is to provide a power train having an input with dual power paths to each of a pair of outputs, one power path being common to each output and having a selectively conditionable forward and reverse drive to a multiple speed ratio gear unit for power delivery to both outputs and the remaining power paths having the forward and reverse drive and including an input driven hydrostatic unit controlling a combined planetary pinion, differential gear unit to provide equal speed, unidirectional drives for straight, forward and reverse drive ranges, to provide infinitely variable and differential speed drives for steering in the different drive ranges and to provide infinitely variable and equal speed, opposite directional drives for steering in neutral.

These and other objects of the invention will be more apparent from the following description and drawing which diagrammatically shows a power train constructed according to this invention.

The invention is illustrated in the preferred embodiment in a track-laying vehicle power train having a prime mover 10 which may be assumed as being a piston engine, a hydrodynamic torque converter 11, a forward and reverse drive unit 12, a three speed planetary gear unit 13, a left steer unit 14, a right steer unit 16, a differential gear unit 18 and a hydrostatic pump and motor unit 19 for controlling differential unit 18. The longitudinal central axes of prime mover 10 and converter 11 are arranged to be longitudinal of the vehicle to provide what is referred to as a T-input drive for the power train which has the longitudinal central axes of units 12, 13, 14, 16, 18 and 19 arranged to be transverse of the vehicle. A barrel housing 22 houses drive unit 12, range unit 13, both the steer units 14 and 16 and differential unit 18, all of these units being coaxially located to provide what may be best described as a single barrel configuration for the units thus enclosed.

Describing these components and their power train connections in detail, prime mover 10 has an output shaft 24 connected by a converter housing 26 to pump blading 28, the converter housing being rotatably supported on suitable bearings and providing a rotatable converter housing for the remaining converter blading. The pump blading 28 exits to turbine blading 29 which is connected by a hub 31 to a turbine or converter output shaft 32. Fluid is circulated toroidally in the torque converter and, as it leaves the turbine blading, it is redirected to the pump blading 28 by stator blading 34 which stator blading is connected to a one-way brake 36. One-way brake 36 is grounded by a sleeve 37 surrounding shaft 32, which sleeve extends out of the converter to rigidly connect with stationary housing 39. The converter, being a three element converter of conventional design, provides torque multiplication in the conventional manner. A converter lockup clutch 38 is provided, which clutch when actuated by any suitable known control means is effective to provide a direct mechanical drive between shaft 24 and shaft 32 to bypass the hydraulic path of the torque converter.

The converter output shaft 32 provides input to the range unit 13 and also to the differential unit 18 via the forward and reverse drive unit 12, the range unit 13 providing one input to each steer unit and the differential gear unit 18 providing another input to each steer unit. The converter output shaft 32 extends beyond the grounded end of sleeve 37 to connect with a spur gear 42 which gear meshes with a second spur gear 43, the latter gear being connected to drive the input shaft 44 of the forward and reverse drive unit 12. Shaft 44 is rotatably supported and arranged transverse to units 13 and 18 and is connected to drive bevel gear 46. Gear 46 meshes at diametrically opposite sides with a forward drive bevel spur gear 48 and a reverse drive bevel spur gear 50, gears 48 and 50 being rotatably supported and concentrically arranged about a sleeve shaft 52, which sleeve shaft is connected into the range unit 13 and the differential gear unit 18. With the gears 48 and 50 thus located, gear 48 is caused to rotate in a forward direction by the converter output shaft 32 and the gear 50 is caused to rotate in the opposite or reverse direction. A forward drive clutch 54, when engaged, connects the forward drive gear 48 to a clutch drum 56 connected to sleeve shaft 52 to thus provide forward drive to shaft 52. A reverse drive clutch 58, when engaged, connects the reverse drive gear 50 to drum 56 to thus drive shaft 52 in reverse.

For the range unit, shaft 52 is connected at its left end to drive the sun gear 60 of a low planetary gear set 61 and the sun gear 62 of an intermediate planetary gear set 64. The sun gear 60 meshes with a plurality of planetary pinions 66 journaled on a planet carrier 67. Carrier 67 is connected by a hub 68 to a shaft 70 which shaft extends through sleeve shaft 52 and is the output for the range unit and the input for both steer units. A ring gear 71 meshes with pinions 66 and is connected by a drum 72 to the planet carrier 74 of the intermediate gear set 64 and to a low brake 76. Low brake 76, when engaged, holds ring gear 71 to provide a low ratio drive to the shaft 70 and in the forward or reverse direction depending on whether the forward drive clutch 54 or the reverse drive clutch 58 is engaged. The sun gear 62 meshes with a plurality of pinions 77 journaled on carrier 74. A ring gear 78 meshes with pinions 77 and is connected to an intermediate brake 80 which, when engaged, holds ring gear 78 to provide an intermediate ratio drive in either forward or reverse to the shaft 70 in which the low ring gear 71 is driven by intermediate carrier 74 in the same direction as low sun gear 60 but at a slower speed. High ratio drive is provided in unit 13 by engagement of a high clutch 82 to connect shaft 52 via a connected hub 83 to the intermediate carrier 74. This locks up the low gear set 61 to provide a direct drive between shaft 52 and shaft 70 whose drive direction will be determined by whether the forward drive clutch 54 or the reverse drive clutch 58 is engaged.

A low low brake 85, when engaged, grounds shaft 70 via hub 68 to enable the steer gear units 14 and 16 to be utilized as low reduction gear units, as will be explained in detail later.

The output shaft 70 of range unit 13 provides one common input power path to steer units 14 and 16 which have matched or equal ratio planetary gear sets 86 and 88. Thus, there are three drive ratios in forward and reverse available to the left and right steer units 14 and 16.

In the left steer gear set 86, the shaft 70 is connected at its left end by a drum 89 to the steer ring gear 90. Ring gear 90 meshes with a plurality of pinions 91 which are journaled on a left output planet carrier 92. Carrier 92 is connected by a drum 94 over ring gear 90 to a drive shaft 96 which in the case of a track-laying vehicle, would be connected through reduction gearing to the left track sprocket. An annular sun gear 97 located concentrically about shaft 70 meshes with pinions 91 and is connected to the differential unit 18 as explained later.

The right end of shaft 70 is connected in similar manner to right steer unit 16 by a drum 98 to the ring gear 100 of the right steer gear set 88. Ring gear 100 meshes with pinions 101 journaled on the right output carrier 102, which carrier is connected by a drum 104 over ring gear 100 to a right drive shaft 106. The right drive shaft 106 would in turn be connected through reduction gearing to the right track sprocket. An annular sun gear 107 freely received on shaft 70 meshes with pinions 101 and is connected to the differential unit 18 as explained later.

Describing now the power path via the differential gear unit 18 to the steer units 14 and 16, the shaft 52 which may be driven in either forward or reverse by drive unit 12 is connected at its right end to a carrier 108 in unit 18. Two sets of planetary pinions are journaled on input carrier 108, namely, a first set 110 and a second set 112, with these sets having associated pinions meshing with each other to provide what is called a combined pinion arrangement. The pinions 110 of the first set also mesh with a ring gear 114 which is connected by a drum 115 and a sleeve shaft 116 surrounding shaft 70 to the right steer sun gear 107. Pinions 110 also mesh with an annular sun gear 118 which gear is connected by a sleeve shaft 119 surrounding shaft 52 and by a spur gear train to the left steer sun gear 97. This spur gear train comprises an annular spur gear 120 driven by shaft 119 and meshing with a second spur gear 121. Gear 121 is connected to the right end of a rotatably supported shaft 122 extending parallel to shafts 52 and 70. Shaft 122 is connected at its left end to a third spur gear 124. Gear 124 meshes with an annular spur gear 126 which is connected by a sleeve shaft 127 surrounding cross shaft 70 to the left steer sun gear 97 to thus complete the geared drive. The second set of pinions 112 in addition to meshing with their associated pinions 110 also mesh with a controlled annular sun gear 129. Thus, the differential gear unit 18 is located intermediate of and coaxial with the steer units 14 and 16 to provide a compact arrangement.

According to this invention, the controlled differential sun gear 129 and the pinions 110 have the same number of teeth and the gear ratio between the differential sun gear 118 and the left steer sun gear 97 is equal to the ratio of the number of teeth of differential sun gear 118 to the number of teeth of differential ring gear 114.

Since the drive through differential gear unit 18 to the steer sun gears 97 and 107 is the algebraic summation of the input carrier 108 drive and the controlled sun gear 129 drive, the speed of the left steer sun gear 97 ($N_{97}$) and the speed of the right steer sun gear 107 ($N_{107}$) can be expressed as a function of the speed of the input differential carrier 108 ($N_{108}$) and the speed of the controlled sun gear 129 ($N_{129}$), hence (1) $\qquad N_{107} = A \times N_{108} + B \times N_{129}$ (2) $\qquad N_{97} = A \times N_{108} - B \times N_{129}$ where A and B are constants and the implied sign and positive sign (+) denotes rotation in one direction and the negative sign (−) denotes rotation in the opposite direction.

From above Equations 1 and 2 it is seen that when the controlled differential sun gear 129 is held and the input differential carrier 108 is driven in either direction, the steer sun gears 97 and 107 are driven with locked drive at the same speed and in the same direction as input carrier 108. Alternatively, when the input differential carrier 108 is held and the controlled differential sun gear 129 is driven in either direction, the right steer sun gear 107 is driven with a locked drive in the same direction as controlled differential sun gear 129 and the left steer sun gear 97 is driven with a locked drive in the opposite direction and at the same speed as the right steer sun gear 107. As another alternative, when the input differential carrier 108 is driving while the controlled differential sun grea is first held and then on subsequent driving of the controlled differential sun gear 129, one of the steer sun gears 97 and 107 is caused to increase its speed by the amount of speed the other steer sun gear is diminished. The usefulness of the differential gear unit 18 will become more clear from the operational summary of our complete power train which is described later.

Hydrostatic control of differential gear unit 18 is provided by the hydrostatic unit 19 operating on controlled sun gear 129 which gear is connected for this purpose by a sleeve shaft 131 to an annular spur gear 134, sleeve shaft 131 being freely received on shaft 119. Spur gear 134 meshes with an idler spur gear 136 which latter gear meshes with a spur gear 137 connected to the shaft 138 of the hydrostatic motor 139 of unit 19. The motor 139 is hydraulically connected to hydrostatic pump 140. The hydrostatic pump 140 is input driven with the converter by the prime mover through a gear train which has a spur gear 141 driven by the converter housing 26 and meshing with a second spur gear 142. Gear 142 is connected by a shaft 144 to drive a bevel gear 146 which bevel gear meshes with a second bevel gear 147 to drive the input shaft 148 of hydrostatic pump 140, shaft 148 extending through motor 139 for this connection. The hydrostatic unit 19 may be of the form disclosed in copending application Ser. No. 279,372, now Pat. No. 3,273,344, filed May 10, 1963, of Howard W. Christenson et al. with the pump 140 having a variable displacement and the motor 139 having a fixed displacement. Unit 19 has a control valve in the hydraulic circuit between the pump and motor manually operated by a handle 151, whereby the output motor shaft 138 may be free to rotate and may also be selectively driven in opposite directions at infinitely variable speeds or held, the speed and holding of output shaft 138 being controlled by a pump displacement control mechanism manualy operated by a handle 152, while the control valve is conditioned for fluid communication between the pump and motor. It will be recognized that with the variable displacement pump 140, the output speed of the motor 139 from zero to a given speed is obtained with constant power output on increasing the displacement of the pump.

The other various brakes and clutches employed in this power train are conventional friction engaging devices and may be actuated in any known way, i.e. electrically, hydraulically, pneumatically or by some mechanical provision and in a certain sequence. The preferred sequence of operation is described in the following illustrative operational summary.

The power train may be operated to provide four speeds in forward and reverse and hydrostatically controlled steering. The first or low low forward drive range which is considered the lowest drive range and provides the greatest torque multiplication is obtained by engaging the forward drive clutch 54 and the low low brake 85 and conditioning the hydrostatic unit 19 to hold motor output shaft 138 and thus the controlled differential sun gear 129 in differential gear unit 18, all other drive establishing devices being disengaged. Since the controlled differential sun gear 129 is held, the steer sun gears 97 and 107 are driven in the same direction which is forward and at the same speed while the steer ring gears 90 and 100 are held by the low low brake 85. Therefore, the steer gear sets 86 and 88 act as reduction gear sets with the locked input drives thus provided to drive their respective output shafts 96 and 106 forwardly. Gear sets 86 and 88 thus produce the maximum torque in the power train at the final drive output shafts only to reduce the torque load on the remainder of the power train.

For steering in the first or low low forward drive range, the displacement control 152 of the hydrostatic unit 19 is operated so that the hydrostatic motor 139, instead of continuing to hold the controlled sun gear 129, is then caused to drive the controlled sun gear 129 in either direction depending on the direction of turn desired. Then, with sun gear 129 rotating in either direction, the steer sun gears 97 and 107 are differentially driven by the differential gear unit 18 with locked differential drives and one of the steer sun gears is speeded up by the same amount that the speed of the opposite steer sun gear is diminished to thereby establish differential steering action. The steering radius is thus put under positive control and made infinitely variable by units 18 and 19 from straight ahead drive in low low down to the minimum radius possible with the gearing provided.

The three higher forward drive ranges are obtained by driving the two connected steer ring gears 90 and 100 forward at different speeds with the forward clutch 54 remaining engaged, holding sun gear 129 of unit 18 by the hydrostatic unit 19 and on selective conditioning of the range unit 13 to provide the low ratio drive (low brake 76 engaged), intermediate ratio drive (intermediate brake 80 engaged) and high ratio drive (high clutch 82 engaged) in that order. In these three higher operating ranges, the steer units then act as power combining and speed differential gear sets receiving power from the range unit 13 through their steer ring gear and from the differential gear unit 18 through their steer sun gear. Hydrostatically controlled differential steering is available in these higher ranges by control of the hydrostatic unit 19 to provide locked differential drive as described in the first or low low forward drive range, recognizing that the speed added to one of the steer sun gears will be equal to the speed subtracted from the opposite steer sun gear while the connected steer ring gears continue to rotate forwardly with their range unit 13 input drive. Thus, the output speed in one steer gear set is increased by the amount the output speed of the opposite steer gear set is diminished to provide the differential steering. Again, the steer radius is under positive control and infinitely variable in the second, third and fourth forward drive ranges from straight ahead down to the minimum radius possible with the gearing provided and assuming that the power train has sufficient power capacity to execute the desired maneuver, the required track forces are not a factor of controllability in the hydrostatically controlled differential steering system provided. Thus, the restrictions on vehicle design and usage are therefore eliminated.

Recognizing that the forward and reverse drive unit 12 provides the input to range unit 13 and differential gear unit 18, the same drive ranges and hydrostatically controlled differential steering provided in forward as described above are also available in reverse by simply disengaging the forward drive clutch 54, engaging the reverse drive clutch 58 and operating units 13 and 19 as before.

For neutral, both the forward and reverse drive clutches 54 and 58 are disengaged, the controlled sun gear 129 of unit 18 is held by unit 19 and there is no output drive to shafts 96 and 106. Steering in neutral is provided by controlling the hydrostatic unit 19 to drive the controlled sun gear 129 in either direction dependent on the direction of turn desired. This causes the differential gear unit 18 to drive the steer sun gears 97 and 107 in opposite directions and at the same speed. Because the steer sun gears are being driven in opposite directions and at the same speed by the free differential drives now provided by unit 18, the connected steer ring gears 90 and 100, though free, provide reaction resulting in the shafts 96 and 106 being driven at equal speeds in opposite directions to produce pivot steering.

The above-described preferred embodiment is illustrative of the invention which may be modified within the scope of the appended claims.

I claim:

1. In a power train the combination of
   (a) an input member, a pair of output members,
   (b) a speed differential gear unit operatively connected to each said output member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units,
   (d) second power transmitting means including a multiple speed ratio gear unit for transmitting power from said input member to both said speed differential gear units and for cooperating with said single input drive of said first power transmitting means to provide dual input drive for both said speed differential gear units,
   (e) and said first power transmitting means including infinitely variable ratio drive means drivingly connected to said input member cooperable with differential gear means arranged intermediate of and coaxial with said speed differential gear units to provide locked, equal ratio, similar directional drives for said single input drives to said speed differential gear units and also to provide an infinitely variable increasing speed drive to one of said speed differential gear units and an equivalent decreasing speed rate drive to the other of said speed differential gear units to produce a speed differential between said output members during the single input drive and also the dual input drive.

2. In a power train the combination of
   (a) an input member, a pair of output members,
   (b) a speed differential gear unit operatively connected to each said output member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units,
   (d) second power transmitting means including a multiple speed ratio gear unit for transmitting power from said input member to both said speed differential gear units and for cooperating with said single input drive of said first power transmitting means to provide dual input drive for both said speed differential gear units,
   (e) and said first power transmitting means including differential gear means arranged intermediate of and coaxial with said speed differential gear units, infinitely variable ratio hydrostatic drive means operatively connecting said input member and said differential gear means for cooperating with said differential gear means to provide locked, equal ratio similar directional drives for said single input drives to said speed differential gear units and also to provide a hydrostatically controlled infinitely variable increasing speed and locked drive to one of said speed differential gear units and an equivalent decreasing speed rate and locked drive to the other of said speed differential gear units to produce a speed differential between said output members during the single input drive and also the dual input drive.

3. In a power train the combination of
   (a) an input member, a pair of output members,
   (b) a speed differential gear unit operatively connected to each said output member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units,
   (d) second power transmitting means including a multiple speed ratio gear unit for transmitting power from said input member to both said speed differential gear units and for cooperating with said single input drive of said first power transmitting means to provide dual input drive for both said speed differential gear units,
   (e) and said first power transmitting means including hydrostatically controlled differential gear means arranged intermediate of and coaxial with said speed differential gear units for effecting hydrostatically controlled, infinitely variable speed, equal speed ratio, similar directional drives to said speed differential gear units to drive said output members at the same speed and in the same direction and also for effecting hydrostatically controlled, infinitely variable speed, equal speed ratio, opposite directional drives to said speed differential gear units to produce a speed differential between said output members and also for effecting a hydrostatically controlled, infinitely variable increasing speed and locked drive to one of said speed differential gear units and an equivalent decreasing speed rate and locked drive to the other of said speed differential gear units to produce a speed differential between said output members.

4. In a power train the combination of
   (a) an input member, a pair of output members,
   (b) a speed differential gear unit operatively connected to each said output member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units,
   (d) second power transmitting means including a multiple speed ratio gear unit for transmitting power from said input member to both said speed differential gear units and cooperating with said single input drive of said first power transmitting means to provide dual input drive for both said speed differential gear units,
   (e) said first power transmitting means including hydrostatically controlled differential gear means for effecting an infinitely variable increasing speed and locked drive to one of said speed differential gear units and an equivalent decreasing speed rate and locked drive to the other of said speed differential gear units to produce a speed differential between said output members during the single input drive and also the dual input drive, (f) and said hydrostatically controlled differential gear means comprising planetary gear means having an input element, duel output elements, combined pinions operativley connecting said input element to said output elements, a control element for controlling said pinions, drive means for drivingly connecting said input member to said input element, drive means for drivingly connecting one of said output elements to one of said speed differential gear units, drive means for drivingly connecting the other said output element to the other of said speed differential gear units, means for selectively driving said control element in opposite directions and for holding said control element, said gear means and the drive means for drivingly connecting said output elements to said speed differential gear units having speed ratios so that speed differential drives to said gear units are provided when said control element is driven and also so that equal speed, unidirectional drives to said gear units are provided when said control element is held.

5. In a power train the combination of
(a) an input member, a pair of output members,
(b) a speed differential gear unit operatively connected to each said output member operable to drive the connected output member with single input drive and also to drive the connected output member with dual input drive at a speed proportional to the speed difference of the dual input drive,
(c) first power transmitting means for transmitting power from said input member to both said speed differential gear units to provide single input drive for both said speed differential gear units,
(d) second power transmitting means including a multiple speed ratio gear unit for transmitting power from said input member to both said speed differential gear units and cooperating with said single input drive of said first power transmitting means to provide dual input drive for both said speed differential gear units,
(e) said first power transmitting means including hydrostatically controlled differential gear means for effecting an infinitely variable increasing speed and locked drive to one of said speed differential gear units and an equivalent decreasing speed rate and locked drive to the other of said speed differential gear units to produce a speed differential between said output members during the single input drive and also the dual input drive,
(f) and said hydrostatically controlled differential gear means comprising a combined pinion, planetary gear set having a first and second sun gear, a ring gear, a carrier having a first set of planetary pinions meshing with said first sun gear and said ring gear and a second set of planetary pinions meshing with said first set of planetary pinions and said second sun gear, drive means for drivingly connecting said input member to said carrier, drive means for drivingly connecting said ring gear to one of said speed differential gear units, drive means for drivingly connecting said first sun gear to the other of said speed differential gear units, hydrostatic means for selectively driving said second sun gear in opposite directions at infinitely variable speeds and for holding said second sun gear.

6. In a power train the combination of
(a) an input member, a pair of output members,
(b) a speed differential gear unit operatively connected to each said output member operable to drive the connected output member with single input drive and also to drive the connected output member with dual input drive at a speed proportional to the speed difference of the dual input drive,
(c) first power transmitting means for transmitting power from said input member to both said speed differential gear units to provide single input drive for both said speed differential gear units,
(d) second power transmitting means including a multiple speed ratio gear unit for transmitting power from said input member to both said speed differential gear units and cooperating with said single input drive of said first power transmitting means to provide dual input drive for both said speed differential gear units,
(e) said first power transmitting means including hydrostatically controlled differential gear means for effecting an infinitely variable increasing speed and locked drive to one of said speed differential gear units and an equivalent decreasing speed rate and locked drive to the other of said speed differential gear units to produce a speed differential between said output members during the single input drive and also the dual input drive,
(f) and said hydrostatically controlled differential gear means comprising a combined pinion, planetary gear set having a first and second sun gear, a ring gear, a carrier having a first set of planetary pinions meshing with said first sun gear and said ring gear and a second set of planetary pinions meshing with said first set of planetary pinions and said second sun gear, first drive means for drivingly connecting said input member to said carrier, second drive means for drivingly connecting said ring gear to one of said speed differential gear units, third drive means for drivingly connecting said first sun gear to the other of said speed differential gear units, hydrostatic means for selectively driving said second sun gear in opposite directions at infinitely variable speeds and for holding said second sun gear, said hydrostatic means comprising a variable displacement hydrostatic pump connected to be driven with said input member, a hydrostatic motor operatively connected to said hydrostatic pump and said second sun gear and control means operable to control said pump and motor to effect the aforementioned control of said second sun gear.

7. The power train set forth in claim 6 and the pinions of said first set and said second sun gear having the same number of teeth, said second drive means having a speed ratio determined by the ratio of the number of teeth of said first sun gear to the number of teeth of said ring gear.

8. In a power train the combination of
(a) a hydrodynamic torque converter having a pump, a turbine and a stator,
(b) a left and a right planetary steer gear set having respectively a left and a right steer sun gear, a left and a right steer ring gear and a left and a right output carrier having pinions meshing with said left and right sun and ring gear respectively, said left and right steer ring gears being connected, a low low brake for braking said steer ring gears,
(c) first power transmiting means for transmitting power from said turbine to said steer ring gears including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means including a forward drive power train operated by forward drive establishing means and a reverse power train operated by reverse drive establishing means for drivingly connecting said turbine to said first and second sun gears, said first carrier being connected to said steer ring gears, a low brake for braking said first ring gear to provide a low speed ratio drive to said steer ring gears, said second carrier being connected to said first ring gear, an intermediate brake for braking said second ring gear to provide an intermediate speed ratio drive to said steer ring gears and a high clutch for locking up said first gear set to provide a high speed ratio and direct drive to said steer ring gears, (d) and second power transmitting means for transmitting power from said turbine to said left and right steer sun gears including hydrostatically controlled differential gear means comprising planetary gear means having a first and a second differential sun gear, a differential ring gear, a differential carrier having a first set of planetary pinions meshing with said first differential sun gear and said differential ring gear and a second set of planetary pinions meshing with said first set of planetary pinions and said second differential sun gear, said first drive means also being operable to drivingly connect said turbine to said differential carrier, second drive means for drivingly connecting said differential ring gear to said right steer sun gear, third drive means for drivingly connecting said first differential sun gear to said left steer sun gear, hydrostatic means for selectively driving said second differential sun gear in opposite directions at infinitely variable speeds and for holding said second differential sun gear.

9. The power train set forth in claim 8 and the pinions of said first set and said second differential sun gear having the same number of teeth, said third drive means having a speed ratio determined by the ratio of the number of teeth of said first differential sun gear to the number of teeth of said differential ring gear.

10. In a power train the combination of
(a) a hydrodynamic torque converter having a pump, a turbine and a stator,
(b) a left and a right planetary steer gear set having respectively a left and a right steer sun gear, a left and a right steer ring gear and a left and a right output carrier having pinions meshing with said left and right sun and ring gear respectively, a shaft connecting said left and right steer ring gears, a low low brake for braking said shaft,
(c) first power transmitting means for transmitting power from said turbine to said shaft including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means including a forward drive power train operated by forward drive establishing means and a reverse power train operated by reverse drive establishing means for drivingly connecting said turbine to said first and second sun gears, said first carrier being connected to said shaft, a low brake for braking said first ring gear to provide a low speed ratio drive to said shaft, said second carrier being connected to said first ring gear, an intermediate brake for braking said second ring gear to provide an intermediate speed ratio drive to said shaft and a high clutch for locking up said first gear set to provide a high speed ratio and direct drive to said shaft,
(d) second power transmitting means for transmitting power from said turbine to said left and right steer sun gears including hydrostatically controlled differential gear means comprising planetary gear means concentrically arranged about said shaft having a first and a second differential sun gear, a differential ring gear, a differential carrier having a first set of planetary pinions meshing with said first differential sun gear and said differential ring gear and a second set of planetary pinions meshing with said first set of planetary pinions and said second differential sun gear, said first drive means also being operable to drivingly connect said turbine to said differential carrier, second drive means for drivingly connecting said differential ring gear to said right steer sun gear, third drive means for drivingly connecting said first differential sun gear to said left steer sun gar, hydrostatic means for selectively driving said second differential sun gear in opposite directions at infinitely variable speeds and for holding said second differential sun gear and comprising a variable displacement hydrostatic pump connected to be driven with said converter pump, a hydrostatic motor operatively connected to said hydrostatic pump and said second differential sun gear and control means operable to control said hydrostatic pump and motor to effect the aforementioned control of said second differential sun gear,
(e) the combination of said left and right steer gear sets and said first and second power transmitting means being operable to provide a neutral condition in which no power is transmitted to said output carriers when both said drive establishing means are disengaged, said second differential sun gear is held and said shaft is free to rotate and to provide the same locked speed ratio and directional drive to said left and right output carrier in a low low, low, intermediate and high drive range when either of said drive establishing means is operated, said second differential sun gear is held and on selective engagement of said low low brake, said low brake, said intermediate brake and said high clutch respectively,
(f) and the combination of said left and right steer gear sets and said first and second power transmitting means being operable to provide steering in all of said drive ranges and neutral when said hydrostatic means is controlled to selectively drive said second differential sun gear in either direction.

11. In a differential unit for a power train the combination of
(a) an input member, a pair of output members,
(b) and planetary drive means for drivingly connecting said input member and said output members including an input element connected to be driven by said input member, each element of a pair of output elements separately connected to drive only one of said output members, a single orbital element drivingly connecting said input element and both said output elements, a control element, another single orbital element drivingly connecting said control element and the first mentioned orbital element so that said output elements are driven by said input element at a constant relative speed when said control element is held and are driven at a relative speed proportional to the speed of said control element when driven and means for selectively holding and driving said control element.

12. In a differential unit for a power train the combination of
(a) an input member, a pair of output members,
(b) and planetary gear means drivingly connecting said input member and said output members including an output sun gear connected to drive one output member, an output ring gear connected to drive the other output member, a control sun gear, means for selectively holding and driving said control sun gear, a carrier connected to be driven by said input member and having a first set of pinions meshing with said output sun gear and said output ring gear and also having a second set of pinions meshing with said first pinion set and said control sun gear.

References Cited

UNITED STATES PATENTS

| | | | |
|---|---|---|---|
| 745,952 | 12/1903 | Barnard | 74—714 X |
| 1,319,367 | 10/1919 | Weidely | 74—714 X |
| 1,401,221 | 12/1921 | Shite | 74—720.5 |
| 2,377,354 | 6/1945 | Merritt | 74—682 X |
| 2,391,735 | 12/1945 | Orshansky | 74—687 X |
| 2,675,716 | 4/1954 | Harlow et al. | 74—675 |
| 2,930,257 | 3/1960 | Christenson | 74—720.5 |

FOREIGN PATENTS 799,532   8/1958   Great Britain.

DONLEY J. STOCKING, Primary Examiner.

J. R. BENEFIEL, A. T. McKEON, Assistant Examiners.